United States Patent
Ogata (10) Patent No.: US 7,386,140 B2
(45) Date of Patent: Jun. 10, 2008

(54) AUDIO INFORMATION TRANSFORMING METHOD, AUDIO INFORMATION TRANSFORMING PROGRAM, AND AUDIO INFORMATION TRANSFORMING DEVICE

(75) Inventor: Satoshi Ogata, Ichikawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 876 days.

(21) Appl. No.: 10/690,819

(22) Filed: Oct. 23, 2003

(65) Prior Publication Data

US 2004/0125241 A1 Jul. 1, 2004

(30) Foreign Application Priority Data

Oct. 23, 2002 (JP) ............................ P. 2002-308528

(51) Int. Cl.
*H04R 5/02* (2006.01)
(52) U.S. Cl. .................. 381/310; 381/306; 381/17; 381/18
(58) Field of Classification Search .............. 381/1, 381/17–18, 300, 302–303, 306–307, 310
See application file for complete search history.

(56) References Cited

U.S. PATENT DOCUMENTS

| | | | | |
|---|---|---|---|---|
| 5,199,075 A * | 3/1993 | Fosgate | ...................... | 381/307 |
| 5,764,777 A * | 6/1998 | Goldfarb | ...................... | 381/27 |
| 5,771,294 A | 6/1998 | Inoue et al. | | |
| 5,993,318 A | 11/1999 | Kousaki | | |
| 6,018,698 A | 1/2000 | Nicosia et al. | | |
| 6,118,880 A * | 9/2000 | Kokkosoulis et al. | ....... | 381/303 |
| 6,574,339 B1 * | 6/2003 | Kim et al. | ..................... | 381/17 |
| 6,633,617 B1 | 10/2003 | Cooklev | | |
| 6,694,033 B1 * | 2/2004 | Rimell et al. | ............... | 381/307 |
| 6,975,731 B1 | 12/2005 | Cohen et al. | | |
| 7,027,600 B1 | 4/2006 | Kaji et al. | | |
| 7,113,610 B1 | 9/2006 | Chrysanthakopoulos | | |
| 7,203,327 B2 * | 4/2007 | Kubota | ....................... | 381/310 |
| 2003/0032955 A1 * | 2/2003 | Mulier et al. | ................. | 606/49 |
| 2003/0044026 A1 | 3/2003 | Chi | | |
| 2003/0118192 A1 * | 6/2003 | Sasaki | .......................... | 381/17 |
| 2004/0086129 A1 * | 5/2004 | Schobben et al. | ............ | 381/18 |

FOREIGN PATENT DOCUMENTS

| | | |
|---|---|---|
| JP | 7-92968 | 4/1995 |
| JP | 09-090963 | 4/1997 |
| JP | 10-257600 | 9/1998 |
| JP | 2001-086497 A | 3/2001 |

* cited by examiner

*Primary Examiner*—Vivian Chin
*Assistant Examiner*—Disler Paul
(74) *Attorney, Agent, or Firm*—McDermott Will & Emery LLP (57) ABSTRACT

The present invention provides an audio information transforming device, an audio information transforming method, and an audio information transforming program, which are capable changing a listening point freely only by one audio stream and also achieving multiple channels only by the 1-channel audio information. In the provided method, a virtual listening point 105 is decided, and then an allocation ratio of the audio to a plurality of loudspeakers is changed based on a ratio of a distance between the virtual listening point 105 and an object 103 and a distance between the object 103 and a basic listening point 102. Accordingly, a large number of audio environments can be produced by changing information of the virtual listening point 105 based on one audio information.

15 Claims, 6 Drawing Sheets

AUDIO INFORMATION TRANSFORMING METHOD, AUDIO INFORMATION TRANSFORMING PROGRAM, AND AUDIO INFORMATION TRANSFORMING DEVICE

BACKGROUND OF THE INVENTION

1. Field of the Invention

The present invention relates to an audio information transforming device, an audio information transforming method, and an audio information transforming program, which are employed in a video/audio format like MPEG (Moving Picture Coding Experts Group) 4 having video information and audio information every object, or a video/audio format like DVD (Digital Versatile Disk) having video information and audio information every scene.

2. Description of the Related Art

In recent years, the video streaming based on the DVD or the broadband is being prosperously carried out, and thus a chance to handle the video/audio format in the home is increased. In particular, since the DVD is spread and the audio apparatuses such as the AV amplifier, etc. become inexpensive, the persons who enjoy the audio in the multiple channels are increased. In the DVD, MPEG 2 is used as the video recording system and Dolby digital (AC-3), DTS (Digital Theater System), linear PCM (Pulse Code Modulation), MPEG audio, or the like is used as the audio recording system. Eight audio streams can be installed into the DVD disk. Thus, if a different sound is loaded on each audio stream respectively, various applications such as dubbing of plural languages, high sound quality playing, commentary, sound track, etc. can be implemented.

Meanwhile, there is MPEG 4 as one of the next generation video/audio formats. In the MPEG 4, the object having video/audio information constituting the scenes that are reproduced on the screen is observed with interest, and the motion picture compression can be effectively attained by coding the motion picture every object.

However, in the multi-channel (e.g., 5.1-channel, etc.) audio system for playing the DVD in the prior art, it is impossible to change the listening point obtained by one audio stream. Therefore, the listener can get the hearing feeling only at the listening point at which the listener himself or herself listens to the audio.

Also, the audio information of each object are converted into the multi-channel audio, a quantity of data is increased. Therefore, a video/audio recording time is shortened correspondingly.

SUMMARY OF THE INVENTION

The present invention has been made in view of the above circumstance, and it is an object of the present invention to provide an audio information transforming device, an audio information transforming method, and an audio information transforming program, which are capable changing a listening point freely only by one audio stream to thereby produce the audio environment that enables the listener to feel that such listener is just in the video, and also achieving multiple channels only by 1-channel audio information to thereby save a quantity of data and prolong a video/audio recording time.

In order to achieve the above object, an audio information transforming method set forth in claim 1 provides an audio information transforming method applied to a video/audio format in which a screen contains a plurality of objects and each object has video information, position information, and audio information, which comprises a virtual listening point setting step of setting a virtual listening point at a position different from a basic listening point that is set as a position at which a listener listens to an audio; a comparing step of comparing a positional relationship between the basic listening point and the object with a positional relationship between the virtual listening point and the object; and a changing step of changing an allocation ratio of an audio to a plurality of audio outputting means based on a compared result in the comparing step.

According to such method, the virtual listening point is decided at the position that is different from the basic listening point, then the positional relationship to the virtual listening point is calculated based on the position information that the object has and also the positional relationship between the object and the basic listening point is calculated, and then the allocation ratio of the audio to a plurality of audio outputting means (e.g., the 5.1-channel loudspeaker system) is changed based on the compared result of respective calculated positional relationships. Therefore, the audio environment with the strong appeal/reality, which enables the listener to feel that such listener just enters into the video (the virtual listening point), can be produced.

Also, an audio information transforming method set forth in claim 2 provides an audio information transforming method applied to a video/audio format in which each scene produced on a screen has video information, audio information, and a virtual sound source, which comprises a setting step of setting a virtual listening point at a position different from a basic listening point that is set as a position at which a listener listens to an audio; a comparing step of comparing a positional relationship between the basic listening point and the virtual sound source with a positional relationship between the virtual listening point and the virtual sound source; and a changing step of changing an allocation ratio of an audio to a plurality of audio outputting means based on a compared result in the comparing step.

According to such method, the positional relationship between the basic listening point and the virtual sound source is calculated and also the positional relationship between the virtual listening point and the virtual sound source is calculated, and then the allocation ratio of the audio to a plurality of audio outputting means (e.g., the 5.1-channel loudspeaker system) is changed based on the compared result of respective calculated positional relationships. Therefore, the audio environment with the strong appeal/reality, which enables the listener to feel that such listener just enters into the video (the virtual listening point), can be produced.

Also, an audio information transforming method set forth in claim 3 provides an audio information transforming method applied to a video/audio format in which a screen contains a plurality of objects and each object has video information, position information, and 1-channel audio information, which comprises a step of calculating a positional relationship between a basic listening point, which is set as a position at which a listener listens to an audio, and the object; and a step of allocating the 1-channel audio information to a plurality of audio outputting means based on the positional relationship.

According to such method, the 1-channel audio information that the object has can be allocated to the multiple channels of the audio based on the positional relationship between the basic listening point and the object, and can be output to a plurality of audio outputting means (e.g., the 5.1-channel loudspeaker system). Therefore, a quantity of data can be saved and the video/audio recording time can be prolonged.

Also, an audio information transforming method set forth in claim 4 provides an audio information transforming method applied to a video/audio format in which a screen contains a plurality of objects and each object has video information, position information, and 1-channel audio information, which comprises a setting step of setting a virtual listening point at a position different from a basic listening point that is set as a position at which a listener listens to an audio; a comparing step of comparing a positional relationship between the basic listening point and the object with a positional relationship between the virtual listening point and the object; and an allocating step of allocating the 1-channel audio information to a plurality of audio outputting means based on a result in the comparing step.

According to such method, the virtual listening point is decided at the position that is different from the basic listening point, then the positional relationship to the virtual listening point is calculated based on the position information that the object has and also the positional relationship between the object and the basic listening point is calculated, and then the 1-channel audio information can be allocated to a plurality of audio outputting means (e.g., the 5.1-channel loudspeaker system) based on the compared result of respective calculated positional relationships. Therefore, the audio environment with the strong appeal/reality, which enables the listener to feel that such listener just enters into the video (virtual listening point), can be produced, and also a quantity of data can be saved and the video/audio recording time can be prolonged.

In addition, in the audio information transforming method according to any one of claim 1, claim 2, or claim 4 as the audio information transforming method set forth in claims 5 to 7, the virtual listening point or the virtual sound source has direction information.

According to such method, the direction information is provided to the virtual listening point or the virtual sound source. Therefore, the listener can feel that such listener just enters into the video (virtual listening point), and the direction to which the listener looks can be changed, and the audio environment with the stronger appeal/reality can be produced.

In order to achieve the above object, an audio information transforming program set forth in claim 8 for causing a computer to execute a procedure of setting a virtual listening point; a procedure of comparing a positional relationship between a basic listening point and an object with a positional relationship between the virtual listening point and the object; and a procedure of changing an allocation ratio of an audio to a plurality of audio outputting means based on a result in the comparing procedure.

In the reproduced audio having the video/audio format such as MPEG 4, for example, such program calculates the positional relationship between the basic listening point and the virtual sound source and also calculates the positional relationship between the virtual listening point and the virtual sound source, and then changes the allocation ratio of the audio to a plurality of audio outputting means (e.g., the 5.1-channel loudspeaker system) based on the compared result of respective calculated positional relationships. Therefore, if the recording medium (the memory such as ROM, or the like) in which this program is recorded is employed, the video/audio player (DVD player, LD player, MPEG player, game, system in the movie theater, etc.), which can produce the audio environment with the strong appeal/reality, which permits the listener to feel that such listener just enters into the video (the virtual listening point), can be implemented.

Also, an audio information transforming program set forth in claim 9 for causing a computer to execute a procedure of setting a virtual listening point; a procedure of comparing a positional relationship between a basic listening point and a virtual sound source with a positional relationship between the virtual listening point and the virtual sound source; and a procedure of changing an allocation ratio of an audio to a plurality of audio outputting means based on a result in the comparing procedure.

In the video/audio format having the audio information and the video information in unit of the scene that is reproduced on the screen, such program calculates the positional relationship between the basic listening point and the virtual sound source and also calculates the positional relationship between the virtual listening point and the virtual sound source, and then changes the allocation ratio of the audio to a plurality of audio outputting means (e.g., the 5.1-channel loudspeaker system) based on the compared result of respective calculated positional relationships. Therefore, if the recording medium (the memory such as ROM, or the like) in which this program is recorded is employed, the video/audio player (DVD player, LD player, MPEG player, game, system in the movie theater, etc.), which can produce the audio environment with the strong appeal/reality, which permits the listener to feel that such listener just enters into the video (the virtual listening point), can be implemented.

Also, an audio information transforming program set forth in claim 10 for causing a computer to execute a procedure of calculating a positional relationship between a basic listening point and an object; and a procedure of allocating 1-channel audio information to a plurality of audio outputting means based on the positional relationship.

In the reproduced audio having the video/audio format such as MPEG 4, for example, such program allocates the 1-channel audio information that the object has to the multiple channels of the audio based on the positional relationship between the basic listening point and the object, and then outputs such audio to a plurality of audio outputting means (e.g., the 5.1-channel loudspeaker system). Therefore, if the recording medium (the memory such as ROM, or the like) in which this program is recorded is employed, the video/audio player (DVD player, LD player, MPEG player, game, system in the movie theater, etc.), which can save a quantity of data and prolong the video/audio recording time, can be implemented.

Also, an audio information transforming program set forth in claim 11 for causing a computer to execute a procedure of setting a virtual listening point; a procedure of comparing a positional relationship between a basic listening point and an object with a positional relationship between the virtual listening point and the object; and a procedure of allocating 1-channel audio information to a plurality of audio outputting means based on a result in the comparing procedure.

In the reproduced audio having the video/audio format such as MPEG 4, for example, such program decides the virtual listening point at the position that is different from the basic listening point, then calculates the positional relationship to the virtual listening point based on the position information that the object has and also calculates the positional relationship between the object and the basic listening point, and then allocates the 1-channel audio information to a plurality of audio outputting means (e.g., the 5.1-channel loudspeaker system) based on the compared result of respective calculated positional relationships. Therefore, if the recording medium (the memory such as ROM, or the like) in which this program is recorded is employed, the video/audio player (DVD player, LD player, MPEG player, game, system in the movie theater, etc.), which can produce the audio environment with the strong appeal/reality, which enables the listener to feel that such listener just enters into the video (the virtual listening point), and also can save a quantity of data and prolong the video/audio recording time, can be implemented.

In order to achieve the above object, an audio information transforming device set forth in claim 12 provides an audio information transforming device for a video/audio format in which a scene reproduced on a screen is constructed to contain objects and each object has video information, position information, and audio information, which comprises a means for deciding a virtual listening point at a position different from a basic listening point that is set as a position at which a listener listens to an audio; a means for comparing a positional relationship between the basic listening point and the object with a positional relationship between the virtual listening point is and the object; and a means for changing an allocation ratio of an audio to a plurality of audio outputting means based on a result of the comparing means.

According to such device, the virtual listening point is decided at the position that is different from the basic listening point, then the positional relationship to the virtual listening point is calculated based on the position information that the object has and also the positional relationship between the object and the basic listening point is calculated, and then the allocation ratio of the audio to a plurality of audio outputting means (e.g., the 5.1-channel loudspeaker system) is changed based on the compared result of respective calculated positional relationships. Therefore, the audio environment with the strong appeal/reality, which enables the listener to feel that such listener just enters into the video (the virtual listening point), can be produced by employing the above audio information transforming device.

Also, an audio information transforming device set forth in claim 13 provides an audio information transforming device for a video/audio format in which each scene produced on a screen has video information, audio information, and a virtual sound source, which comprises a means for deciding a virtual listening point at a position different from a basic listening point that is set as a position at which a listener listens to an audio; a means for comparing a positional relationship between the basic listening point and the virtual sound source with a positional relationship between the virtual listening point and the virtual sound source; and a means for changing an allocation ratio of an audio to a plurality of audio outputting means based on a result of the comparing means.

According to such device, the positional relationship between the basic listening point and the virtual sound source is calculated and also the positional relationship between the virtual listening point and the virtual sound source is calculated, and then the allocation ratio of the audio to a plurality of audio outputting means (e.g., the 5.1-channel loudspeaker system) is changed based on the compared result of respective calculated positional relationships. Therefore, the audio environment with the strong appeal/reality, which enables the listener to feel that such listener just enters into the video (the virtual listening point), can be produced by employing the above audio information transforming device.

Also, an audio information transforming device set forth in claim 14 provides an audio information transforming device for a video/audio format in which a screen contains a plurality of objects and each object has video information, position information, and 1-channel audio information, which comprises a means for calculating a positional relationship between a basic listening point, which is set as a position at which a listener listens to an audio, and the object; and a means for allocating the 1-channel audio information to a plurality of audio outputting means based on the positional relationship.

According to such device, the 1-channel audio information that the object has can be allocated to the multiple channels of the audio based on the positional relationship between the basic listening point and the object, and can be output to a plurality of audio outputting means (e.g., the 5.1-channel loudspeaker system). Therefore, if the above audio information transforming device is employed, a quantity of data can be saved and the video/audio recording time can be prolonged.

Also, an audio information transforming device set forth in claim 15 provides an audio information transforming device for a video/audio format in which a screen contains a plurality of objects and each object has video information, position information, and 1-channel audio information, which comprises a means for deciding a virtual listening point at a position different from a basic listening point that is set as a position at which a listener listens to an audio; a means for comparing a positional relationship between the basic listening point and the object with a positional relationship between the virtual listening point and the object; and a means for allocating the 1-channel audio information to a plurality of audio outputting means based on a result of the comparing means.

According to such device, the virtual listening point is decided at the position that is different from the basic listening point, then the positional relationship to the virtual listening point is calculated based on the position information that the object has and also the positional relationship between the object and the basic listening point is calculated, and then the 1-channel audio information can be allocated to a plurality of audio outputting means (e.g., the 5.1-channel loudspeaker system) based on the compared result of respective calculated positional relationships. Therefore, if the above audio information transforming device is employed, the audio environment with the strong appeal/reality, which enables the listener to feel that such listener just enters into the video (virtual listening point), can be produced, and also a quantity of data can be saved and the video/audio recording time can be prolonged.

In addition, in the audio information transforming device according to any one of claim 12, claim 13, or claim 15 as the audio information transforming device set forth in claims 16 to 18, the virtual listening point or the virtual sound source has direction information.

According to such device, the direction information is provided to the virtual listening point or the virtual sound source. Therefore, if the above audio information transforming device is employed, the listener can feel that such listener just enters into the video (virtual listening point), and the direction to which the listener looks can be changed, and the audio environment with the stronger appeal/reality can be produced.

In the drawings, the reference numerals 101, 501, and 601, each refers to a screen; 102 to a basic listening point; each of 103, 104, and 602 to an object; 105 to a virtual listening point; each of 502 and 901 to a virtual sound source; and each of 110 to 115 to a loudspeaker.

DETAILED DESCRIPTION OF THE PREFERRED EMBODIMENTS

Embodiments according to the present invention will be explained in detail with reference to the drawings hereinafter. Details of an audio information transforming method will be explained in detail in respective embodiments hereinafter. In this case, this audio information transforming method can be implemented as an audio information transforming program as procedures that are executed by a computer, and can be constructed as an audio information transforming device by storing this audio information transforming program in a storing medium such as a memory, or the like.

First Embodiment

A first embodiment according to the present invention will be explained with reference to FIG. 1 to FIG. 4 hereunder.

The present embodiment is concerned with a video/audio format such as MPEG 4, or the like, in which the screen contains a plurality of objects and each object has video information, position information, and audio information. Assume that a screen 101 shown in FIG. 1 has the audio information that is supposed to be listened by the listener at a basic listening point 102.

Figure 1:
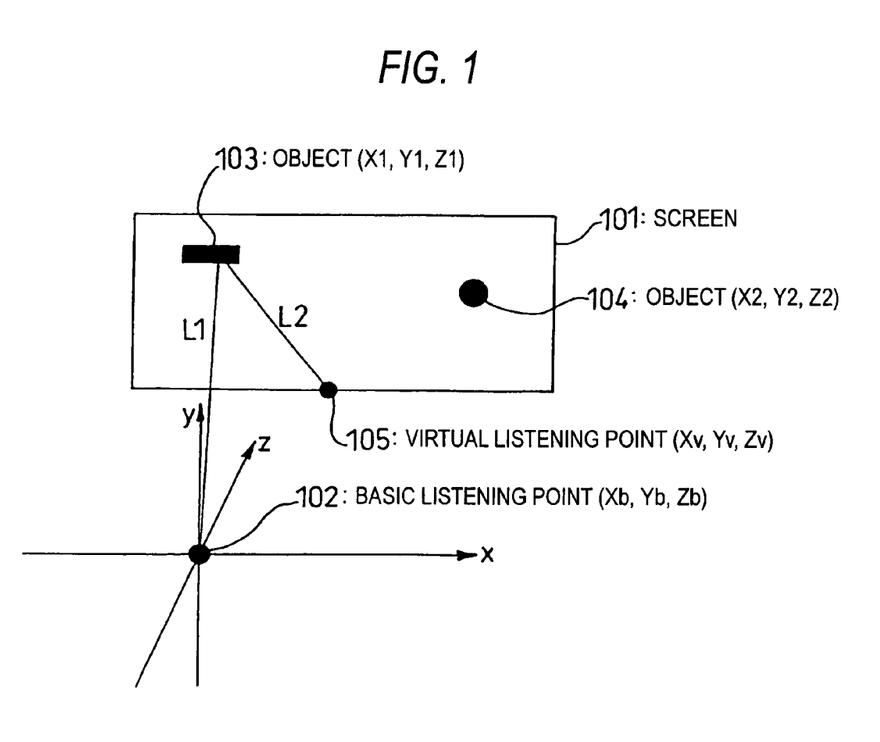
FIG. 1 is a view explaining a first embodiment according to the present invention.

Also, assume that the scene is being played on the screen 101 and two objects 103, 104 are present in the scene. The objects 103, 104 have video stream (video information), audio stream (audio information), and position information respectively.

The virtual listening point 105 is decided on the coordinate in such screen 101, and then the audio environment that permits the listener to feel that such listener is listening to the audio just at a virtual listening point 105 is produced.

As an example of the multi-channel audio system, an example of 5.1-channel will be explained herein.

Figure 2:
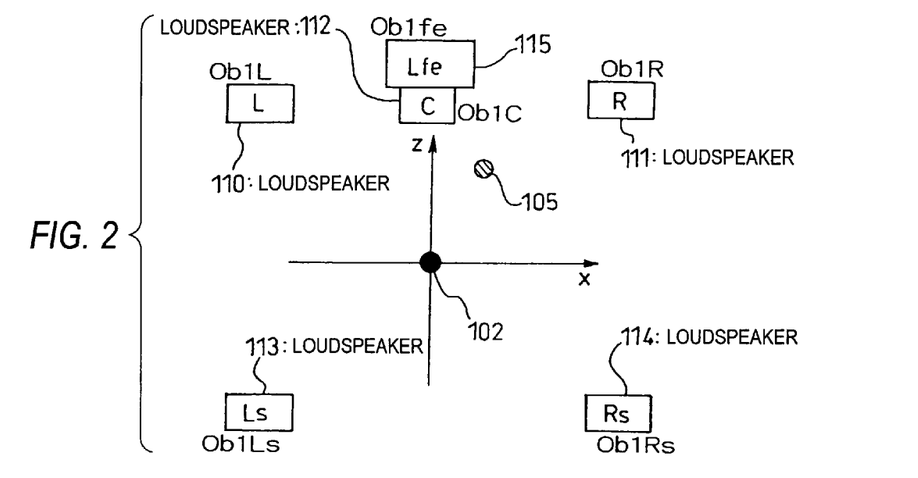
FIG. 2 is a view explaining the first embodiment according to the present invention, and a view showing positional images among respective loudspeakers, a basic listening point, and a virtual listening point in an X-Z coordinate plane.

The object 103 has the audio stream in 5.1-channels. Assume that the audio information in respective channels are Ob1L, Ob1R, Ob1C, Ob1Ls, Ob1Rs, Ob1Lfe, as shown in FIG. 2, for example.

Figure 3:
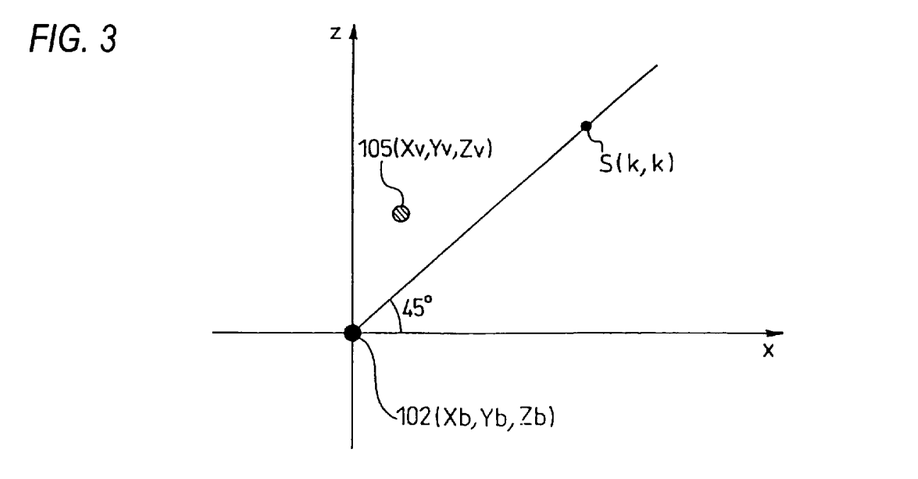
FIG. 3 is a view explaining the first embodiment according to the present invention, and a view showing positional images among a virtual sound source, a basic listening point, and a virtual listening point in an X-Z coordinate plane.

Here, an R-channel of stream data of the object 103, for example, is observed. Assume that the object 103 itself has a sound source and that, as shown in FIG. 3, a virtual sound source of the R component (audio information Ob1R) of the object 103 is S(k,k).

Also, as shown in FIG. 1, assume that a distance from the basic listening point 102 to the object 103 is set to L1 and a distance from the virtual listening point 105 to the object 103 is set to L2. Then, a loudness Vvr1 of the sound, which is listened at the virtual listening point 105, with respect to a loudness Vbr1 of the sound in the R channel, which is listened at the basic listening point 102, is calculated by Equation (1) based on a ratio of the distance L1 between the basic listening point 102 and the object 103 to the distance L2 between the virtual listening point 105 and the object 103. In this case, assume that the loudness of the sound is in inverse proportion to square of the distance.

[Formula 1]

$$Vvr1 = \frac{l1^2}{l2^2} Vbr1 \quad (1) \qquad [\text{Formula 1}]$$

Figure 4:
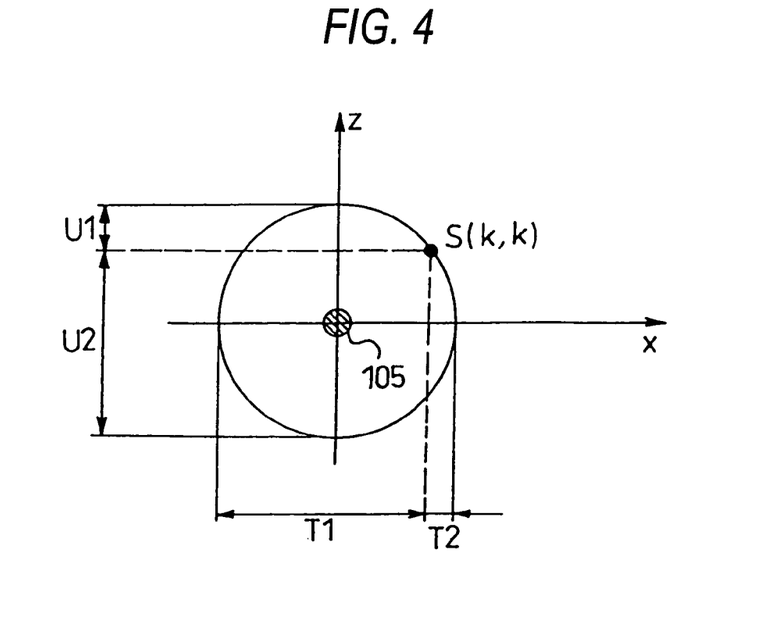
FIG. 4 is a view explaining the first embodiment according to the present invention, and a view showing a positional relationship between the virtual listening point and the virtual sound source when such virtual listening point is regarded as a center.

The loudness Vvr1 of the sound that is listened at the virtual listening point 105 is regarded as the loudness of the sound emitted from the virtual sound source S, and then the sound is allocated to respective loudspeakers 110, 111, 113, and 114. In other words, as shown in FIG. 4, a circle on a circumference of which the virtual sound source S is positioned is supposed around the virtual listening point 105 as the center. Then, a perpendicular is drawn from the virtual sound source S to the X-axis and the Z-axis respectively, then intersection points between the perpendiculars and respective axes and also intersection points between the circle and respective axes are detected, and then ratios of their distances are calculated. Then, if calculated results are represented as T1:T2 and U1:U2 respectively, an allocation ratio of the sound that is emitted from the virtual sound source S is given as follows.

$$L:R = T2^2 : T1^2 \quad [\text{Formula 2}]$$

$$Front:Rear = U2^2 : U1^2 \quad [\text{Formula 3}]$$

That is, a relationship is given as follows. The loudness Vvr1 of the sound in the R channel, which is listened at the virtual listening point 105, is allocated to respective loudspeakers 110, 111, 113, and 114 based on this ratio.

$$L:R:Ls:Rs = T2^2 : T1^2 : \frac{U1^1}{U2^2}T2^2 : \frac{U1^2}{U2^2}T1^2 \quad [\text{Formula 4}]$$

That is to say, the R component obtained when the sound of the object 103 in the R channel with respect to the basic listening point 102 is listened at the virtual listening point 105 can be derived by Equation (2).

[Formula 5] (2)

$$Vv\_r\_r1 = \frac{T1^2}{T1^2 + T2^2 + \frac{U1^2}{U2^2}T1^2 + \frac{U1^2}{U2^2}T2^2} Vvr1$$

$$= \frac{T1^2}{\left(1 + \frac{U1^1}{U2^2}\right)(T1^2 + T2^2)} \frac{l1^2}{l2^2} Vbr1$$

In this case, above Equation (2) indicates the R component obtained when the R-channel component of the object 103 (R-channel component at the basic listening point 102) is allocated to the audio component that is listened at the virtual listening point 105.

Also, the loudness Vvr1 of the sound that is listened at the virtual listening point 105 is allocated to L component, Rs component, and Ls component in the same way as the above calculation. The data of the object 103 except the R channel are allocated similarly. Then, the audio information when the sound of the object 103 is listened at the virtual listening point 105 are completed by adding these data. The R component, which is taken as an example, is given by an equation (3).

[Formula 6]

$$Vv\_r1 = Vv\_r\_r1 + Vv\_r\_l1 + Vv\_r\_rs1 + Vv\_r\_ls1 \quad (3)$$

The audio information is completed every scene by executing these calculations every object and then adding calculated results. The R component, which is taken as an example, is given by a following equation.

[Formula 7]

$$Vv\_r = Vv\_r1 + Vv\_r2 + Vv\_r3 + \ldots \quad (4)$$

Also, the above calculation is applied to L component, Rs component, and Ls component. Thus, the audio information, which are to be listened at the virtual listening point 105, are completed by outputting the audio information onto respective channels.

In this manner, according to the present embodiment, the virtual listening point 105 is decided at the position that is different from the basic listening point 102, then the positional relationship between the virtual listening point 105 and the object and the positional relationship between the basic listening point 102 and the object are calculated every object, and then an allocation ratio of the audio to the loudspeakers 110, 111, 113 and 114 is changed based on these positional relationships. Therefore, the audio environment with strong appeal/reality, which enables the listener to feel that such listener is positioned just at the virtual listening point 105 in the video, can be produced.

In this case, in the present embodiment, an example of the 5.1-channel system is explained as the multi-channel audio system. But other audio systems each having the different channel number may be employed.

Second Embodiment

Next, a second embodiment according to the present invention will be explained with reference to FIG. 5 hereunder.

Unlike the case (MPEG 4, or the like) in which, as shown in the above first embodiment, the screen has the video information and the audio information in unit of the object, the case in which the screen has the video information and the audio information in unit of the scene, which is reproduced on the screen like the existing DVD, will be explained herein.

Figure 5:
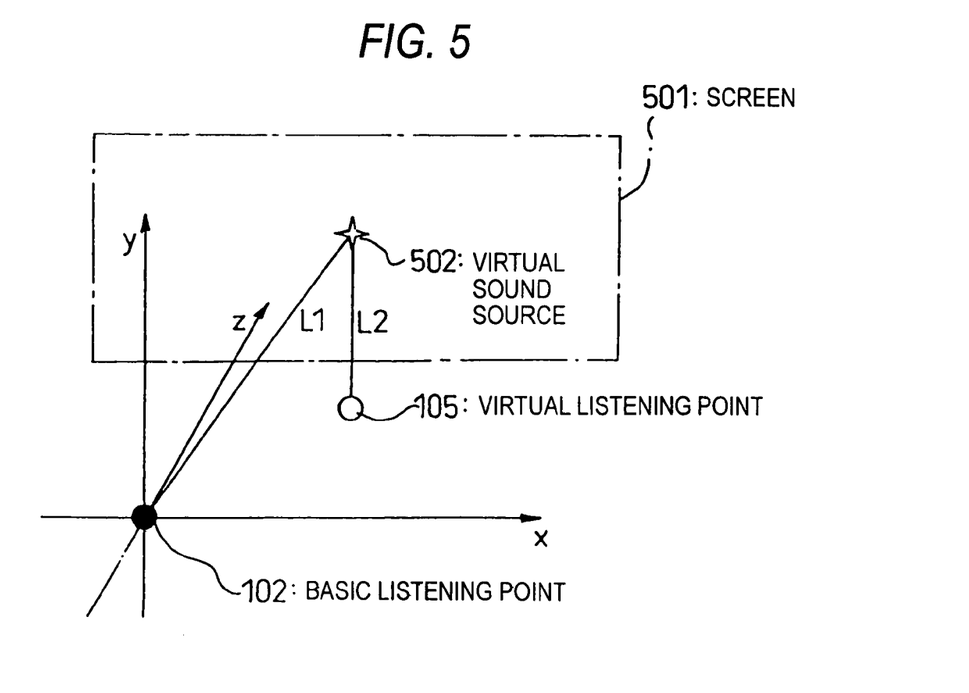
FIG. 5 is a view explaining a second embodiment according to the present invention.

In other words, assume that the scene is reproduced in a screen 501 shown in FIG. 5 and this scene has the video information and the audio information that is supposed to be listened at the basic listening point 102. An example in which the audio information that are to be output from respective channels are prepared when the virtual listening point 105 is decided will be explained.

First, a virtual sound source 502 is decided. The calculation method in the first embodiment can be employed by replacing the object in the first embodiment with this virtual sound source 502. Assume that the virtual sound source 502 is decided instead of the object in FIG. 1 and a distance from the basic listening point 102 is set to L1 and a distance from the virtual listening point 105 is set to L2. As shown in FIG. 3, the virtual sound source S (k,k) is decided in the direction to the loudspeaker. Then, as shown in FIG. 4, the circle on the circumference of which the virtual sound source S is positioned is supposed around the virtual listening point 105 as the center. If a portion (Vv\_r\_r) that is listened at the virtual listening point 105 is calculated by allocating the channel R components Vbr, Vbr, which are listened at the basic listening point 102, such portion is given by an equation (5).

$$Vv\_r\_r = \frac{T1^2}{T1^2 + T2^2 + \frac{U1^2}{U2^2}T1^2 + \frac{U1^2}{U2^2}T2^2} Vvr \qquad \text{[Formula 8]}$$

$$= \frac{T1^2}{\left(1 + \frac{U1^1}{U2^2}\right)(T1^2 + T2^2)} \frac{l1^2}{l2^2} Vbr$$

The R component of the sound, which is listened at the virtual listening point 105, is completed by adding all the allocated R components.

[Formula 9]

$$Vv\_r = Vv\_r\_r + Vv\_r\_l + Vv\_r\_rs + Vv\_r\_ls \quad (6)$$

In this case, L component, Rs component, and Rl component of the sound, which is listened at the basic listening point 102, except the R component are also allocated to the sounds that are to be listened at the virtual listening point 105, by the similar calculation.

When the data are used as the audio information and then the audio in the data are output from respective loudspeakers 110, 111, 113, and 114 as the audio information, the listener can enjoy the audio environment in which the virtual listening point 105 is set as the listening point. Also, the listener can enjoy many audio environments by changing the coordinate system of the virtual listening point 105.

In this fashion, according to the present embodiment, the virtual listening point 105 is decided at the position that is different from the basic listening point 102, then the positional relationship between the virtual listening point 105 and the virtual sound source 502 and the positional relationship between the basic listening point 102 and the virtual sound source 502 are calculated every scene, and then an allocation ratio of the audio to the loudspeakers 110, 111, 113 and 114 is changed based on these positional relationships. Therefore, the audio environment with the strong appeal/reality, which enables the listener to feel that such listener is positioned just at the virtual listening point 105 in the video, can be produced.

Third Embodiment

A third embodiment according to the present invention will be explained with reference to FIG. 6 and FIG. 7 hereunder.

In the present embodiment, assume that the scene that is reproduced on the screen consists of the background and objects and each object has the video stream and the audio stream in which 1-channel audio information are contained. As shown in FIG. 6, the basic listening point 102 is set. Several objects (respective audio streams have the one-channel audio information) are present on the scene. For example, the audio information of an object 602 are produced by the basic listening point 102 and the coordinate information of the object 602 as the multi-channel audio information.

Figure 7:
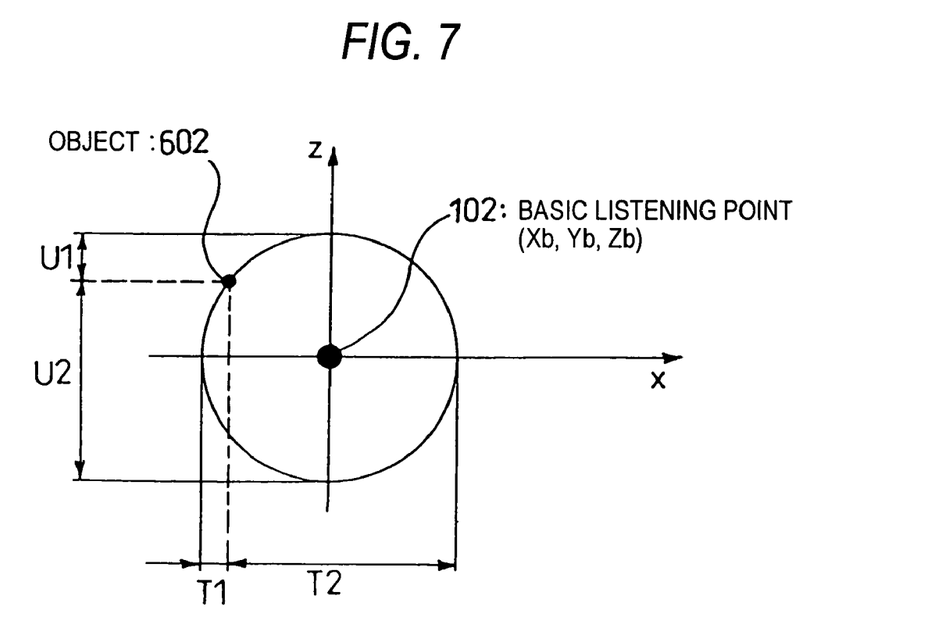
FIG. 7 is a view explaining the third embodiment according to the present invention, and a view showing a positional relationship between the basic listening point and an object when such basic listening point is regarded as the center.

As shown in FIG. 7, a circle is drawn such that the circle has the basic listening point 102 as the center and also the object 602 is positioned on its circumference. Then, a perpendicular is drawn from the object 602 to the X-axis and the Z-axis respectively, and then intersection points between the perpendiculars and the X-axis and the Z-axis and also intersection points between the circle and the X-axis and the Z-axis are detected respectively. Then, if ratios of distances from the intersection points between the circle and the concerned axis to the intersection point between the perpendicular and the concerned axis are represented as the X-axis=T1:T2 and the Z-axis=U1:U2 respectively, an allocation ratio of the sound that is emitted from the object 602 is given as follows.

$$L:R = T2^2 : T1^2 \quad \text{[Formula 10]}$$

$$\text{Front:Rear} = U2^2 : U1^2 \quad \text{[Formula 11]}$$

That is, the allocation ratio is given as follows.

$$L:R:Ls:Rs = T2^2 : T1^2 : \frac{U1^1}{U2^2}T2^2 : \frac{U1^2}{U2^2}T1^2 \quad \text{[Formula 12]}$$

The audio information in the audio stream, that the object 602 has, are allocated to respective channels based on this ratio. When a plurality of objects are present, this process is executed every object, and then allocated audio information in respective channels are added and output from respective loudspeakers 110, 111, 113 and 114. Therefore, the listener can enjoy the multi-channel audio even in the scene that is composed of the object that has only the 1-channel audio information. Also, since there is no necessity that the multi-channel data should be loaded previously, a quantity of data can be reduced.

In this manner, according to the present embodiment, in the video/audio format that has video information, position information of this video data, and 1-channel audio information every object, the allocation ratio of the audio to the loudspeakers 110, 111, 113, and 115 is changed based on the positional relationship between the basic listening point 102 and the object every object. Therefore, the reality can be enhanced by producing the multi-channel audio information even from the 1-channel audio information, and the audio information can be reduced to one channel only.

Fourth Embodiment

Figure 8:
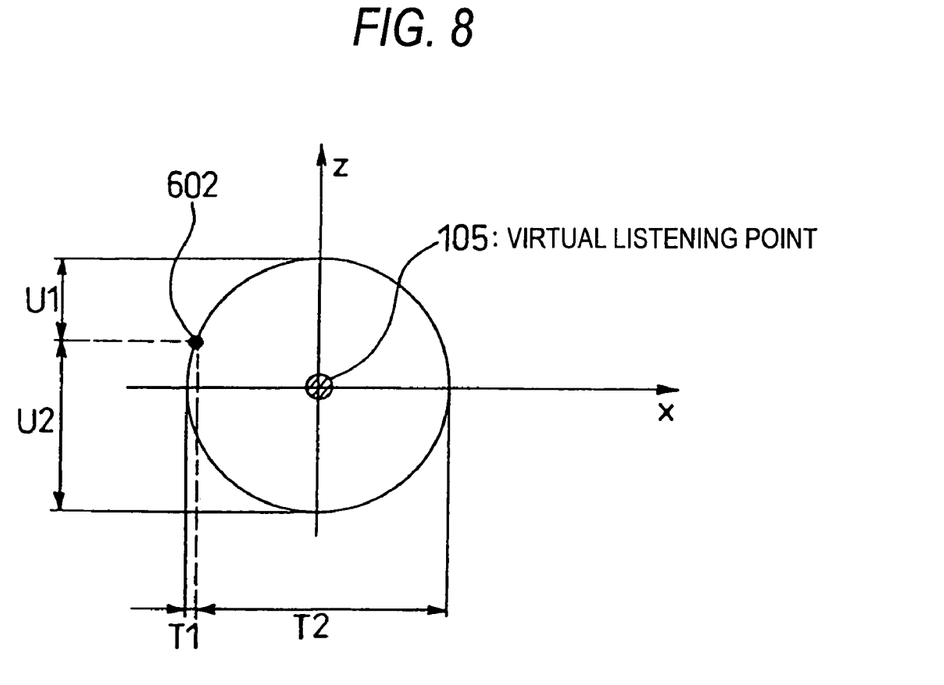
FIG. 8 is a view explaining a fourth embodiment according to the present invention, and a view showing a positional relationship between the virtual listening point and the object when such virtual listening point is regarded as the center.

A fourth embodiment according to the present invention will be explained with reference to FIG. 6 and FIG. 8 hereunder.

The virtual listening point 105 is added to the configuration in which the object 602 has the 1-channel audio information, as described in the above third embodiment. The audio environment that permits the listener to feel that such listener is listening to the sound just at the virtual listening point 105 can be produced by adding the virtual listening point 105.

Figure 6:
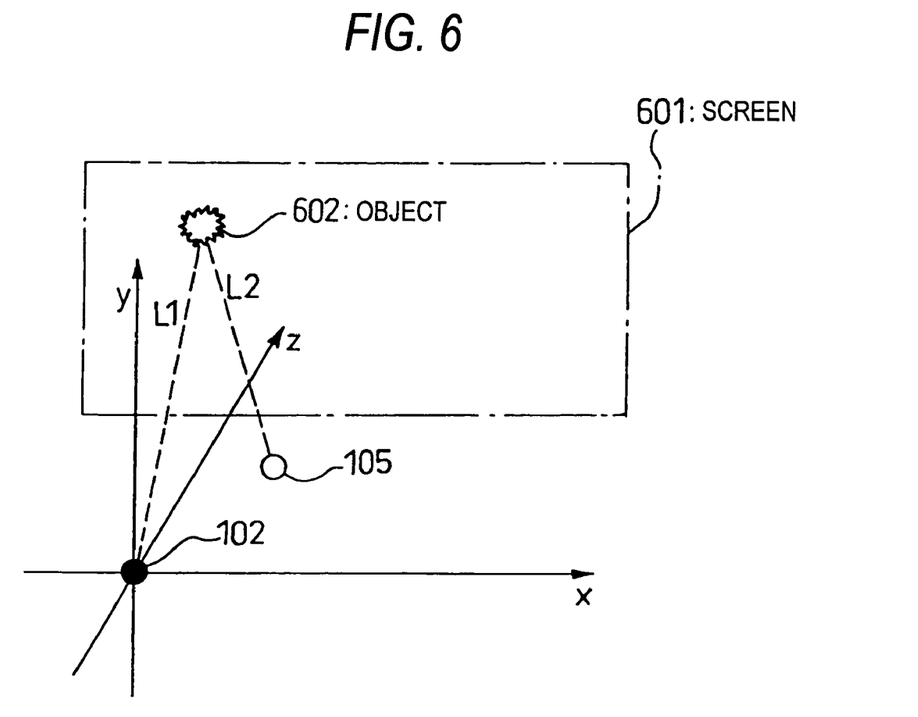
FIG. 6 is a view explaining a third embodiment according to the present invention.

In FIG. 6, assume that a distance between the basic listening point 102 and the object 602 is L1 and a distance between the virtual listening point 105 and the object 602 is L2. In FIG. 8, a circle is drawn such that the circle has the virtual listening point 105 as the center and also the object 602 is positioned at a point on its circumference. Then, a perpendicular is drawn from the object 602 to the X-axis and the Z-axis respectively, and then intersection points between the perpendiculars and the X-axis and the Z-axis and also intersection points between the circle and the X-axis and the Z-axis are calculated respectively. Then, if ratios of distances from the intersection points between the circle and the concerned axis to the intersection point between the perpendicular and the concerned axis are represented as the X-axis=T1:T2 and the Z-axis=U1:U2 respectively, an allocation ratio of the sound that is emitted from the object 602 is given as follows.

$$L:R = T2^2 : T1^2 \quad \text{[Formula 13]}$$

$$\text{Front:Rear} = U2^2 : U1^2 \quad \text{[Formula 14]}$$

That is, the allocation ratio is given as follows.

$$L:R:Ls:Rs = T2^2 : T1^2 : \frac{U1^1}{U2^2}T2^2 : \frac{U1^2}{U2^2}T1^2 \quad \text{[Formula 15]}$$

If the audio information of the object 602 is assumed as Vobj1, the R component, which is taken as an example, is given by an equation (7).

$$Vv\_r1 = \frac{T1^1}{1 + \left(\frac{U1^2}{U2^2}\right)(T1^2 + T2^2)} \frac{l1^2}{l2^2} Vobj1 \quad (7) \quad \text{[Formula 16]}$$

The R component of the audio information, which is to be listened at the virtual listening point, can be produced by deciding the allocation of the R components of the audio information emitted from all objects based on the similar calculation and then adding these components. Also, the audio information, which is to be listened at the virtual listening point, can be produced by applying the above calculation to remaining L component, Rs component, and Ls component.

In this manner, according to the present embodiment, in the video/audio format that has video information, position information of this video data, and 1-channel audio information every object, the distance L1 between the basic listening point 102 and the object 602 and the distance L2 between the virtual listening point 105 and the object 602 are calculated, and then the allocation ratio of the audio to the loudspeakers 110, 111, 113, and 114 is changed based on the result. Therefore, the reality can be enhanced by producing the multi-channel audio information even from the 1-channel audio information, and the audio information can be reduced to one channel only.

Fifth Embodiment

Next, a fifth embodiment according to the present invention will be explained with reference to FIG. 9 hereunder.

The listener's choice can be further increased by providing the direction information to the virtual listening point 105 in the first embodiment, the second embodiment, and the fourth embodiment. More particularly, the audio environment that permits the listener to feel that such listener just stands on the virtual listening point 105 and looks to the direction indicated by the direction information of the virtual listening point 105 is produced by changing the allocation of the audio information to respective channels. Information that the virtual listening point 105 has are the coordinate and the direction vector.

When the positional relationship between the virtual sound source S(k,k) and the virtual listening point 105 is considered in the first embodiment and the second embodiment and also the positional relationship between the object 602 and the virtual listening point 105 is considered in the fourth embodiment, the direction information of the virtual listening point 105 is also considered.

In the first embodiment, the second embodiment, and the fourth embodiment, the allocation of the audio information is executed on the premise that the listener looks to the front in the Z-axis direction. Therefore, when the direction of the virtual sound source (the first embodiment and the second embodiment) or the object 602 (the fourth embodiment) is considered, an angle between the Z-axis and the direction vector is considered. In this example, the rotation on the X-Z plane is considered.

Figure 9:
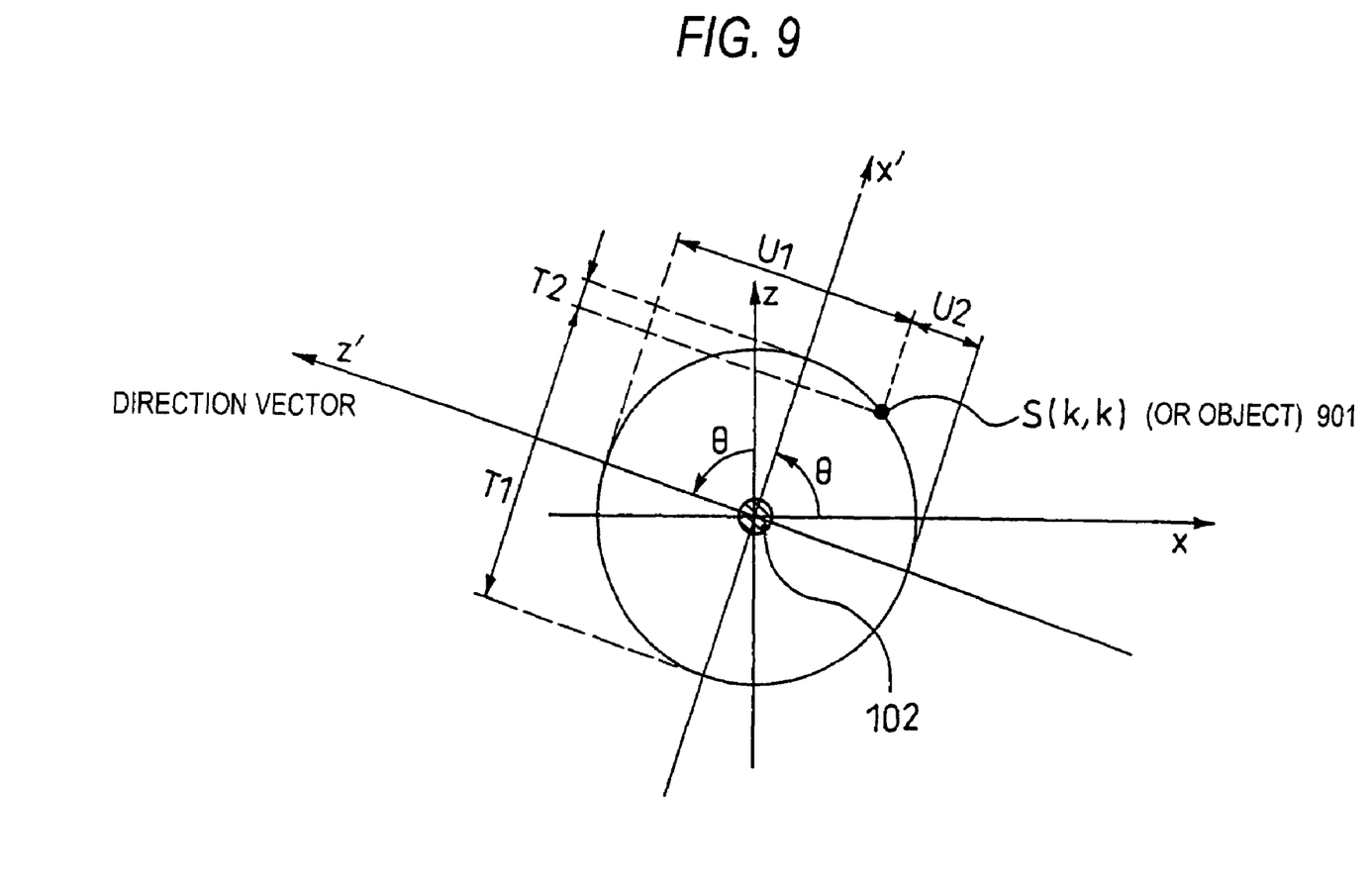
FIG. 9 is a view explaining a fifth embodiment according to the present invention.

As shown in FIG. 9, the X'-axis and the Z'-axis are set by rotating the X-axis and the Z-axis by an angle θ between the direction vector and the Z-axis. Then, a perpendicular is drawn from the virtual sound source S (k,k) the object 602 to the X'-axis and the Z'-axis respectively, and then intersection points between the perpendiculars and the X'-axis and the Z'-axis and also intersection points between the circle and the X'-axis and the Z'-axis are calculated respectively. Then, ratios of distances from the intersection points between the circle and the concerned axis to the intersection point between the perpendicular and the concerned axis are represented as the X'-axis=T1:T2 and the Z'-axis=U1:U2 respectively. Subsequently, according to the calculation method explained in the first embodiment, the second embodiment, and the fourth embodiment, the audio information can be supplied to respective channels in the audio environment in which the listener looks to the direction indicated by the direction vector from the basic listening point 102.

In this manner, according to the present embodiment, the direction vector information as well as the position information is provided to the virtual listening point 105, then the distance/direction to the virtual listening point are calculated based on the scene coordinate information that respective objects have, and then the allocation ratio of the audio to the loudspeakers 110, 111, 113, and 114 is changed based on the result. Therefore, the reality can be enhanced by producing the multi-channel audio information even from the 1-channel audio information. In addition, since the direction vector information as well as the position information is provided to the virtual listening point 105, the reality can be enhanced further rather than the first embodiment, the second embodiment, and the fourth embodiment, described above.

If a decoder for decoding the video/audio format is constructed by using the audio information transforming method, the audio information transforming program, the audio information transforming device in respective embodiments described above, the video/audio player (DVD player, LD player, MPEG player, game, system in the movie theater, etc.), which can achieve advantages of respective embodiments, can be implemented.

ADVANTAGES OF THE INVENTION

As described in detail above, according to the audio information transforming method set forth in claim 1, the virtual listening point is decided at the position that is different from the basic listening point, then the positional relationship to the virtual listening point is calculated based on the position information that the object has and also the positional relationship between the object and the basic listening point is calculated, and then the allocation ratio of the audio to a plurality of audio outputting means (e.g., the 5.1-channel loudspeaker system) is changed based on the compared result of respective calculated positional relationships. Therefore, the audio environment with the strong appeal/reality, which enables the listener to feel that such listener just enters into the video (the virtual listening point), can be produced.

Also, according to the audio information transforming method set forth in claim 2, the positional relationship between the basic listening point and the virtual sound source is calculated and also the positional relationship between the virtual listening point and the virtual sound source is calculated, and then the allocation ratio of the audio to a plurality of audio outputting means (e.g., the 5.1-channel loudspeaker system) is changed based on the compared result of respective calculated positional relationships. Therefore, the audio environment with the strong appeal/reality, which enables the listener to feel that such listener just enters into the video (the virtual listening point), can be produced.

Also, according to the audio information transforming method set forth in claim 3, the 1-channel audio information that the object has can be allocated to the multiple channels of the audio based on the positional relationship between the basic listening point and the object, and can be output to a plurality of audio outputting means (e.g., the 5.1-channel loudspeaker system). Therefore, a quantity of data can be saved and the video/audio recording time can be prolonged.

Also, according to the audio information transforming method set forth in claim 4, the virtual listening point is decided at the position that is different from the basic listening point, then the positional relationship to the virtual listening point is calculated based on the position information that the object has and also the positional relationship between the object and the basic listening point is calculated, and then the 1-channel audio information can be allocated to a plurality of audio outputting means (e.g., the 5.1-channel loudspeaker system) based on the compared result of respective calculated positional relationships. Therefore, the audio environment with the strong appeal/reality, which enables the listener to feel that such listener just enters into the video (virtual listening point), can be produced, and also a quantity of data can be saved and the video/audio recording time can be prolonged.

Also, according to the audio information transforming method set forth in claims 5 to 7, the direction information is provided to the virtual listening point or the virtual sound source. Therefore, the listener can feel that such listener just enters into the video (virtual listening point), and the direction to which the listener looks can be changed, and the audio environment with the stronger appeal/reality can be produced.

According to the audio information transforming program set forth in claim 8, in the reproduced audio having the video/audio format such as MPEG 4, for example, the positional relationship between the basic listening point and the virtual sound source is calculated and also the positional relationship between the virtual listening point and the virtual sound source is calculated, and then the allocation ratio of the audio to a plurality of audio outputting means (e.g., the 5.1-channel loudspeaker system) is changed based on the compared result of respective calculated positional relationships. Therefore, if the recording medium (the memory such as ROM, or the like) in which this program is recorded is employed, the video/audio player (DVD player, LD player, MPEG player, game, system in the movie theater, etc.), which can produce the audio environment with the strong appeal/reality, which permits the listener to feel that such listener just enters into the video (the virtual listening point), can be implemented.

Also, according to the audio information transforming program set forth in claim 9, in the video/audio format having the audio information and the video information in unit of the scene that is reproduced on the screen, the positional relationship between the basic listening point and the virtual sound source is calculated and also the positional relationship between the virtual listening point and the virtual sound source is calculated, and then the allocation ratio of the audio to a plurality of audio outputting means (e.g., the 5.1-channel loudspeaker system) is changed based on the compared result of respective calculated positional relationships. Therefore, if the recording medium (the memory such as ROM, or the like) in which this program is recorded is employed, the video/audio player (DVD player, LD player, MPEG player, game, system in the movie theater, etc.), which can produce the audio environment with the strong appeal/reality, which permits the listener to feel that such listener just enters into the video (the virtual listening point), can be implemented.

Also, according to the audio information transforming program set forth in claim 10, in the reproduced audio having the video/audio format such as MPEG 4, for example, the 1-channel audio information that the object has can be allocated to the multiple channels of the audio based on the positional relationship between the basic listening point and the object, and can be output to a plurality of audio outputting means (e.g., the 5.1-channel loudspeaker system). Therefore, if the recording medium (the memory such as ROM, or the like) in which this program is recorded is employed, the video/audio player (DVD player, LD player, MPEG player, game, system in the movie theater, etc.), which can save a quantity of data and prolong the video/audio recording time, can be implemented.

Also, according to the audio information transforming program set forth in claim 11, in the reproduced audio having the video/audio format such as MPEG 4, for example, the virtual listening point is decided at the position that is different from the basic listening point, then the positional relationship to the virtual listening point is calculated based on the position information that the object has and also the positional relationship between the object and the basic listening point is calculated, and then the 1-channel audio information is allocated to a plurality of audio outputting means (e.g., the 5.1-channel loudspeaker system) based on the compared result of respective calculated positional relationships. Therefore, if the recording medium (the memory such as ROM, or the like) in which this program is recorded is employed, the video/audio player (DVD player, LD player, MPEG player, game, system in the movie theater, etc.), which can produce the audio environment with the strong appeal/reality, which enables the listener to feel that such listener just enters into the video (the virtual listening point), and also can save a quantity of data and prolong the video/audio recording time, can be implemented.

According to the audio information transforming device set forth in claim 12, the virtual listening point is decided at the position that is different from the basic listening point, then the positional relationship to the virtual listening point is calculated based on the position information that the object has and also the positional relationship between the object and the basic listening point is calculated, and then the allocation ratio of the audio to a plurality of audio outputting means (e.g., the 5.1-channel loudspeaker system) is changed based on the compared result of respective calculated positional relationships. Therefore, the audio environment with the strong appeal/reality, which enables the listener to feel that such listener just enters into the video (the virtual listening point), can be produced by employing the above audio information transforming device.

Also, according to the audio information transforming device set forth in claim 13, the positional relationship between the basic listening point and the virtual sound source is calculated and also the positional relationship between the virtual listening point and the virtual sound source is calculated, and then the allocation ratio of the audio to a plurality of audio outputting means (e.g., the 5.1-channel loudspeaker system) is changed based on the compared result of respective calculated positional relationships. Therefore, the audio environment with the strong appeal/reality, which enables the listener to feel that such listener just enters into the video (the virtual listening point), can be produced by employing the above audio information transforming device.

Also, according to the audio information transforming device set forth in claim 14, the 1-channel audio information that the object has can be allocated to the multiple channels of the audio based on the positional relationship between the basic listening point and the object, and can be output to a plurality of audio outputting means (e.g., the 5.1-channel loudspeaker system). Therefore, if the above audio information transforming device is employed, a quantity of data can be saved and the video/audio recording time can be prolonged.

Also, according to the audio information transforming device set forth in claim 15, the virtual listening point is decided at the position that is different from the basic listening point, then the positional relationship to the virtual listening point is calculated based on the position information that the object has and also the positional relationship between the object and the basic listening point is calculated, and then the 1-channel audio information can be allocated to a plurality of audio outputting means (e.g., the 5.1-channel loudspeaker system) based on the compared result of respective calculated positional relationships. Therefore, if the above audio information transforming device is employed, the audio environment with the strong appeal/reality, which enables the listener to feel that such listener just enters into the video (virtual listening point), can be produced, and also a quantity of data can be saved and the video/audio recording time can be prolonged.

In addition, according to the audio information transforming device set forth in claims 16 to 18, the direction information is provided to the virtual listening point or the virtual sound source. Therefore, if the above audio information transforming device is employed, the listener can feel that such listener just enters into the video (virtual listening point), and the direction to which the listener looks can be changed, and the audio environment with the stronger appeal/reality can be produced.

What is claimed is:

1. An audio information transforming method applied to a video/audio format in which a screen includes a plurality of objects and each object has video information, position information, and audio information, said method comprising the steps of:
    setting a virtual listening point at a position different from a basic listening point that is set as a position at which a listener listens to an audio;
    comparing a positional relationship between the basic listening point and the object with a positional relationship between the virtual listening point and the object;
    setting a position of a virtual sound source; and
    changing an allocation ratio of an audio to a plurality of audio outputting means based on a compared result in the comparing step, a position of the virtual listening point and the position of the virtual sound source.

2. An audio information transforming method applied to a video/audio format in which each scene produced on a screen has video information, audio information, and a virtual sound source, said method comprising the steps of:
    setting a virtual listening point at a position different from a basic listening point that is set as a position at which a listener listens to an audio;
    comparing a positional relationship between the basic listening point and the virtual sound source with a positional relationship between the virtual listening point and the virtual sound source; and
    changing an allocation ratio of an audio to a plurality of audio outputting means based on a compared result in the comparing step, a position of the virtual listening point and a position of the virtual sound source.

3. An audio information transforming method applied to a video/audio format in which a screen contains a plurality of objects and each object has video information, position information, and 1-channel audio information, said method comprising the steps of:
    setting a virtual listening point at a position different from a basic listening point that is set as a position at which a listener listens to an audio;
    comparing a positional relationship between the basic listening point and the object with a positional relationship between the virtual listening point and the object;
    setting a position of a virtual sound source; and
    allocating the 1-channel audio information to a plurality of audio outputting means based on a result in the comparing step, a position of the virtual listening point and the position of the virtual sound source.

4. The audio information transforming method according to claim 1, further comprising a step of:
    adding direction information to the virtual listening point or the virtual sound source.

5. The audio information transforming method according to claim 2, further comprising a step of:
    adding direction information to the virtual listening point or the virtual sound source.

6. The audio information transforming method according to claim 3, further comprising a step of:
    adding direction information to the virtual listening point or the virtual sound source.

7. A computer-readable medium having a computer-executable instructions for causing a computer to execute the procedures of:
    setting a virtual listening point;
    setting a position of a virtual sound source;
    comparing a positional relationship between a basic listening point and an object with a positional relationship between the virtual listening point and the object; and
    changing an allocation ratio of an audio to a plurality of audio outputting means based on a result in the comparing procedure, a position of the virtual listening point and the position of the virtual sound source.

8. A computer-readable medium having a computer-executable instructions for causing a computer to execute the procedures of:
    setting a virtual listening point;
    comparing a positional relationship between a basic listening point and a virtual sound source with a positional relationship between the virtual listening point and the virtual sound source; and
    changing an allocation ratio of an audio to a plurality of audio outputting means based on a result in the comparing procedure, a position of the virtual listening point and a position of the virtual sound source.

9. A computer-readable medium having a computer-executable instructions for causing a computer to execute the procedures of:
    setting a virtual listening point;
    setting a position of a virtual sound source:
    comparing a positional relationship between a basic listening point and an object with a positional relationship between the virtual listening point and the object; and
    allocating 1-channel audio information to a plurality of audio outputting means based on a result in the comparing procedure, a position of the virtual listening point and the position of the virtual sound source.

10. An audio information transforming device for a video/audio format in which a scene reproduced on a screen is constructed to contain objects and each object has video information, position information, and audio information, said device comprising:
    means for deciding a virtual listening point at a position different from a basic listening point that is set as a position at which a listener listens to an audio;
    means for setting a position of a virtual sound source:
    means for comparing a positional relationship between the basic listening point and the object with a positional relationship between the virtual listening point and the object; and
    means for changing an allocation ratio of an audio to a plurality of audio outputting means based on a result of the comparing means, a position of the virtual listening point and the position of the virtual sound source.

11. An audio information transforming device for a video/audio format in which each scene produced on a screen has video information, audio information, and a virtual sound source, said device comprising:

means for deciding a virtual listening point at a position different from a basic listening point that is set as a position at which a listener listens to an audio;

means for comparing a positional relationship between the basic listening point and the virtual sound source with a positional relationship between the virtual listening point and the virtual sound source; and means for changing an allocation ratio of an audio to a plurality of audio outputting means based on a result of the comparing means, a position of the virtual listening point and a position of the virtual sound source.

12. An audio information transforming device for a video/audio format in which a screen contains a plurality of objects and each object has video information, position information, and 1-channel audio information, said device comprising:

means for deciding a virtual listening point at a position different from a basic listening point that is set as a position at which a listener listens to an audio;

means for setting a position of a virtual sound source;

means for comparing a positional relationship between the basic listening point and the object with a positional relationship between the virtual listening point and the object; and means for allocating the 1-channel audio information to a plurality of audio outputting means based on a result of the comparing means, a position of the virtual listening point and the position of the virtual sound source.

13. The audio information transforming device according to claim 10, wherein the virtual listening point or the virtual sound source has direction information.

14. The audio information transforming device according to claim 11, wherein the virtual listening point or the virtual sound source has direction information.

15. The audio information transforming device according to claim 12, wherein the virtual listening point or the virtual sound source has direction information.

* * * * *